United States Patent [19]
Przybylski

[11] Patent Number: 4,594,969
[45] Date of Patent: * Jun. 17, 1986

[54] METHOD AND APPARATUS FOR PRODUCING A FUEL MIXTURE

[76] Inventor: Aleksander Przybylski, 5801 SW. 47th St., Miami, Fla. 33155

[*] Notice: The portion of the term of this patent subsequent to Jan. 17, 2000 has been disclaimed.

[21] Appl. No.: 505,971

[22] Filed: Jun. 20, 1983

Related U.S. Application Data

[63] Continuation of Ser. No. 307,318, Sep. 29, 1981, abandoned, which is a continuation-in-part of Ser. No. 916,200, Jun. 16, 1978, abandoned.

[51] Int. Cl.$^4$ .......................................... F02M 25/02
[52] U.S. Cl. .................................. 123/25 E; 123/536
[58] Field of Search ................ 123/25 A, 25 E, 25 L, 123/536, 537

[56] References Cited

U.S. PATENT DOCUMENTS

| | | | |
|---|---|---|---|
| 1,423,482 | 7/1922 | Higgins | 123/25 A |
| 3,051,148 | 8/1962 | Warner | 123/25 A |
| 3,701,513 | 10/1972 | Carter | 123/25 L |
| 3,911,871 | 10/1975 | Williams et al. | 123/25 L |
| 4,132,247 | 1/1979 | Lindberg | 123/25 E |
| 4,183,338 | 1/1980 | Lindberg | 123/25 E |
| 4,324,209 | 4/1982 | Gerry | 123/25 E |

Primary Examiner—Ira S. Lazarus
Attorney, Agent, or Firm—Dennis H. Lambert

[57] ABSTRACT

A method and apparatus for producing a fuel mixture for an internal combustion engine or burner, comprises series-connected generators of microaerosol particles of water, fuel and/or oxidizer, in which the particles of water serve as carriers for the fuel. The resultant thin layers of fuel substantially increase the surface area of the fuel, and the water core of each particle enables an optimum water content to be achieved.

10 Claims, 8 Drawing Figures

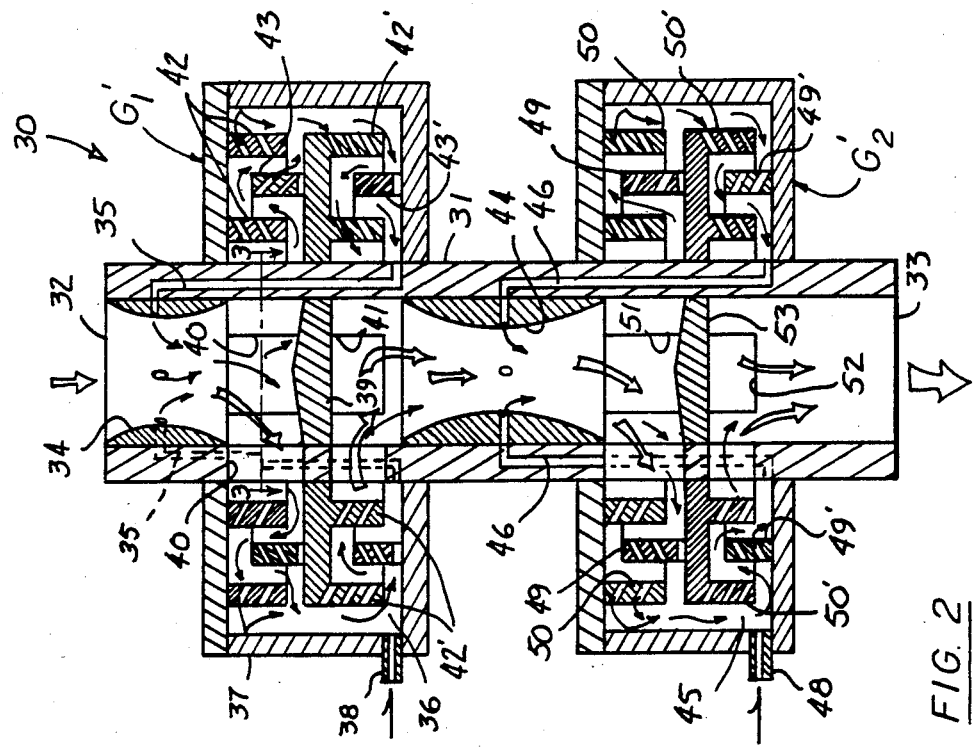
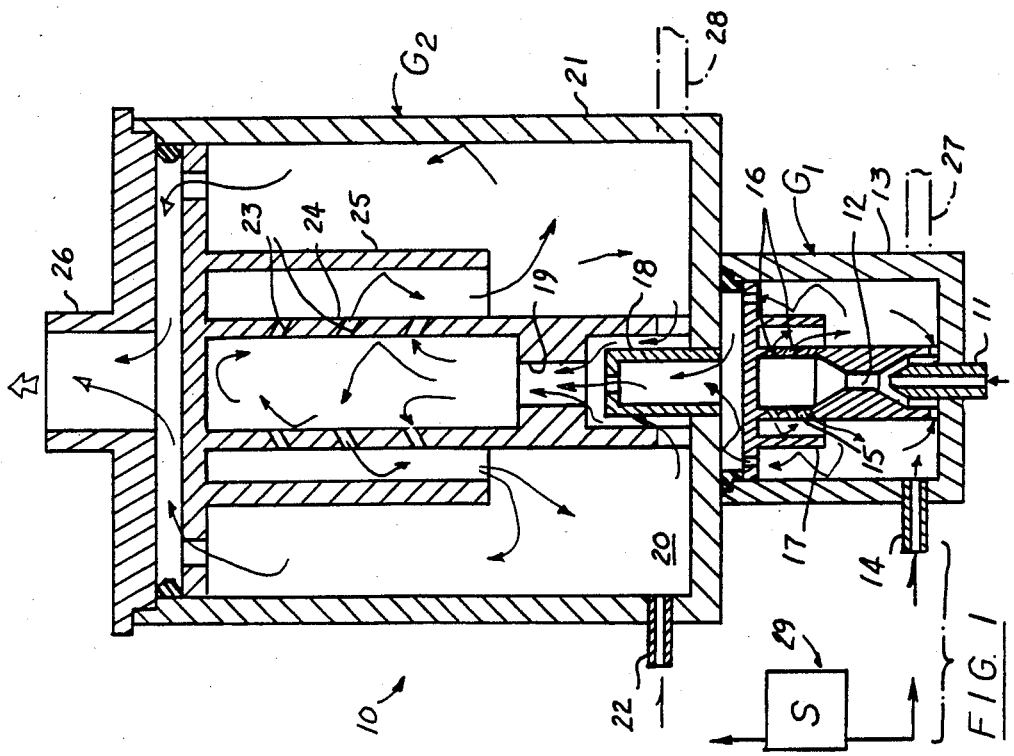

METHOD AND APPARATUS FOR PRODUCING A FUEL MIXTURE

CROSS REFERENCE TO RELATED APPLICATIONS

This application is a continuation of application Ser. No. 307,318 filed Sept. 29, 1981, now abandoned, which was a continuation-in-part of application Ser. No. 916,200, filed June 16, 1978, now abandoned.

BACKGROUND OF THE INVENTION

1. Field of the Invention

This invention relates to method and apparatus for producing fuel mixtures, and more particularly, relates to such method and apparatus for the production of microaerosol particles of water, fuel and/or oxidizer in an optimum mixture for internal combustion engines or burners.

The process of combustion of liquid fuel in an internal combustion engine or other burner is determined by the composition of the fuel mixture as well as the degree of atomization of the fuel. Even when the proportions of fuel and air are optimally chosen, there is still the problem of incomplete combustion and consequent diminished performance of the engine as well as pollution of the environment. Even in the case of an excess of oxygen in the gaseous phase of the mixture, the process of combustion is slow and proceeds at a high temperature.

In addition to certain optimal conditions pertaining to the fuel/air mixture, there are also desired optimum conditions relating to the water content in the fuel mixture. For instance, the water content in the fuel mixture modifies the process of combustion, and there is ample reason to attempt to obtain an optimum water content during the preparation of a fuel mixture in order to maximize engine performance and burning of the fuel as well as to minimize pollution of the environment.

2. Prior Art

Various attempts have been made in the prior art to achieve optimum air/fuel mixtures, including introduction of water into the mixture, and to thoroughly atomize or vaporize the mixture before introducing it into the cylinders of the engine.

For instance, U.S. Pat. No. 3,911,871 describes a system for adding water to the intake system of an engine, and uses a vacuum controlled injector which passes water over an ultrasonic atomizer 52 to atomize the water.

U.S. Pat. No. 4,183,338 uses exhaust gas and vacuum condition at the PCV inlet to achieve a fluidic control of the flow of fuel into the engine. Vortex chambers are used as the controlling devices in conjunction with exhaust gas pressure and PCV vacuum.

U.S. Pat. No. 4,324,209 describes an apparatus for obtaining an homogenized fuel/water mixture and then vaporizing it before admixing the mixture with air for introduction into the engine. The apparatus includes a transducer 313 in a chamber into which fuel and water are introduced to be homogenized. The homogenized mixture is then passed through a steel wool baffle 18 to diffuse the fuel/water mixture.

Other attempts at supplying water to internal combustion engines are described in U.S. Pat. Nos. 2,218,522, 2,352,267, 3,325,976, 3,608,529, 3,980,055, 4,005,683, 4,018,192 and 4,030,457. The simple addition of water, however, does not give satisfactory results. For instance, this step alone does not result in significantly higher efficiency of the engine. Thus, although the introduction of water as steam or liquid does reduce atmospheric contamination caused by unburned pollutants in the products of combustion, and the lowering of the temperature of the combustion process, the problem of preparation of the optimal fuel mixture still remains.

A recent effort at solving the problems relating to fuel mixtures and their preparation is described in U.S. Pat. No. 4,048,963. However, this arrangement does not give completely satisfactory results. The ultrasonic vibration produces an emulsion, but the emulsion burns slowly and does not significantly increase the efficiency of the engine, which "runs with the same power as on straight gasoline". The inhomogeneity of the emulsion particles of the mixture of fuel and water implies the shortcomings of its application. Besides, preparation of the fuelwater emulsion requires a special device and additional energy expenditure.

The prior art thus describes several methods and devices for the injection of water and/or the control of injection with regard to the cycle of the engine. However, in all cases the fuel and water are separate particles, and the resultant fuel mixture is inhomogeneous.

SUMMARY OF THE INVENTION

The primary object of the invention is to provide a fuel mixture having an extremely high degree of dispersion of fuel particles with a high total surface area of the fuel particles.

Another object of the invention is to provide a fuel mixture in which a uniform and homogeneous mixture of particles of fuel and carrier is obtained, and in which the carrier comprises water or oxidizer.

A further object of the invention is to provide a fuel mixture for internal combustion engines or burners, by using series-connected microaerosol generators of the carrier substance, water or oxidizer, and subsequently fuel.

These objects and other advantages are accomplished by the carburetor and method as described herein, in which water is used as the carrier for the fuel and in which atomization of the fuel and oxidizer combined with water improves the burning of the fuel and maximizes the power of the internal combustion engine or other burner. In contemporary engines operating at high revolutions per minute, the time of production of the fuel mixture is on the order of the time of its burning. In the case of introduction of the fuel by injection, the air/fuel mixture in the combustion chamber is not homogeneous enough and conditions which enhance the quality of its preparation are decisive with regard to the final efficiency of combustion of the mixture.

Aplying the technique of aerosol production enables an ideal mixture to be approached. Since the life time of microaerosol particles exceeds considerably the duration of time required to introduce the fuel mixture into the cylinder of the engine and up to the moment of ignition, the resultant mixture remains homogeneous and enables rapid burning and enhanced efficiency to be achieved. A pseudovaporized perfect mixture of finely atomized fuel and air would exhibit all desirable characteristics such as high homogeneity, high total surface area, low compression temperature, less knocking tendency, high volumetric efficiency and uniform distribution of the mixture resulting in higher performance of the engine. In the case of uniform distribution of the fuel (and/or oxidizer), the combustion mixture is characterized by a high degree of homogeneity of the particles and by the optimum ratio of the fuel film to the water core of the particle. This implies optimal conditions for the dynamics of combustion of the fuel mixture.

The microaerosol carburetor of the invention produces particles having a small size in the range of from about $1 \times 10^{-6}$ to about $5 \times 10^{-8}$ m. Additionally, the sedimentation rate coefficient is below 1. The high number (over billions of particles per ml of solution) and the great total surface area imply a significant increase in the efficiency of the engine working with the herein described mode of carburetion of the fuel mixture as compared to a conventional system. The carburetor of the invention comprises series-connected microaerosol generators which produce microaerosol particles of water and fuel, with the fuel forming a layer or film on cores of water. The series-connected generators of the invention may be pressure driven, for example, as described more fully hereinafter, and may be of any suitable type.

BRIEF DESCRIPTION OF THE DRAWINGS

Other objects of this invention will appear in the following description and appended claims, reference being made to the accompanying drawings forming a part of the specification, and wherein like reference characters designate like parts throughout the several views.

FIG. 1 is a somewhat schematic cross-sectional view of a first form of carburetor according to the invention;

FIG. 2 is a view similar to FIG. 1 of a modification of the invention, taken along line 2—2 in FIG. 3;

DESCRIPTION OF THE PREFERRED EMBODIMENTS

Figure 3:
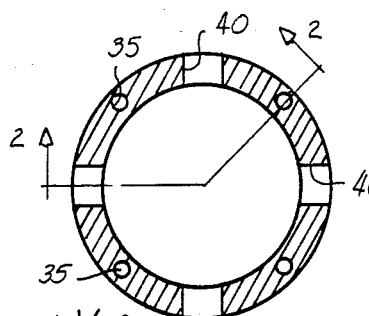
FIG. 3 is a transverse cross-sectional view taken along line 3—3 in FIG. 2.

Referring more specifically to the drawings, a first form of carburetor according to the invention is indicated generally at 10 in FIG. 1 and comprises first and second series-connected microaerosol generators $G_1$ and $G_2$ for producing a microaerosol of the carrier (water) and the fuel (and/or oxidizer), respectively.

The constructional materials and dimensions of the carburetor depend upon the particular requirements of the use to which the carburetor is put. The essential requirement is that the carburetor have at least two series-connected microaerosol generators for the production of the fuel mixture for the burner or for the internal combustion engine.

In the particular example shown, the carburetor operates by positive pressure derived from a suitable source such as a compressor or the like, not shown. In operation, air under pressure is introduced through nozzle or jet 11 and into venturi 12, drawing water up from the reservoir defined in housing 13. Water is supplied to the reservoir through an inlet 14 from a suitable source, not shown. Due to the action of the venturi, microaerosol particles of water are produced and are then dispersed and subjected to the action of the perforated upper cylindrical section 15 of the venturi housing. These particles of water are caused to impact many times against the perforated housing and upon passing through the perforations 16, are caused to impact against the depending cylindrical baffle 17, further breaking up the particles. Larger particles fall down into the reservoir and are again drawn into the venturi by the action caused by the flow of air through it. Smaller, microaerosol particles pass upwardly into a second nozzle or jet 18, comprising a part of the second microaerosol generator.

The microaerosol particles of water flow through a second venturi 19 after exiting the jet 18, pulling liquid fuel into the venturi from fuel reservoir 20 defined in housing 21. Liquid fuel is supplied to the reservoir from a suitable source, not shown, via an inlet 22. The pressure difference generated in the venturi causes the fuel to break up into microaerosol particles which form a film or layer on the water particles. The resultant water-fuel mixture is homogeneous, uniformly dispersed and very finely atomized. The resultant microaerosol mixture is then passed through perforations 23 in cylindrical housing 24, impacting many times against the walls of the housing in the process, resulting in further break-up of the particles of water and fuel. Upon passing through the perforations the particles strike depending cylindrical wall 25. Droplets and larger particles fall back down into the reservoir for recycling through the venturi and the smaller water-fuel microaerosol particles in air pass upwardly through an outlet 26 from which the mixture is directed to a burner or to the combustion chamber of an internal combustion engine.

The pressure difference across the jets 11, 18 and the outlet 26 causes the fuel and water to be drawn into the venturis and broken up into small particles, and the series connection of the generators results in the fuel forming a film on the water particles, substantially increasing the total surface area of the fuel.

An additional inlet 27 is provided into the water reservoir 13 for adding trace amounts of the fuel, e.g. in the ratio of about 1:100, and an additional inlet 28 is provided into the fuel reservoir 20 for adding a fuel-water emulsion to the microaerosol generator $G_2$.

The ratio between water and fuel, as well as the respective composition of the water-fuel microaerosol in air are determined by the size of the generator chambers and the amounts of liquids supplied as well as by the developed head pressure across the air jet 11 and outlet 26. These values are determined by the given constructional demands of the burner or engine.

Figure 4:
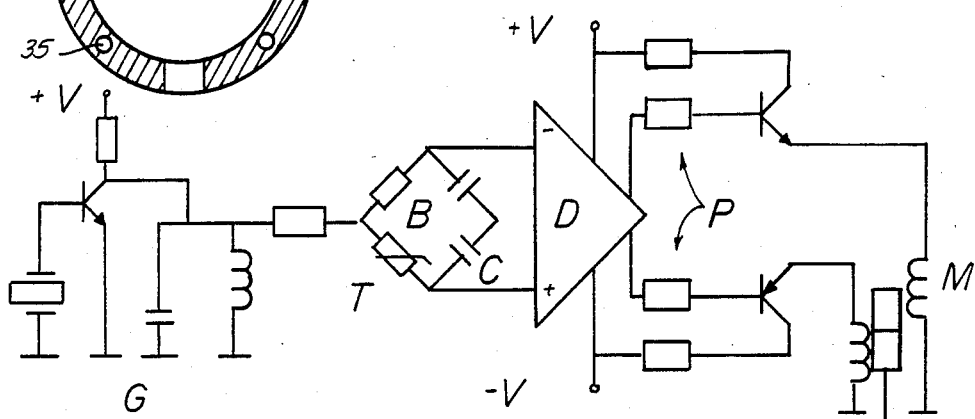
FIG. 4 is a schematic circuit diagram of an electronic control device for maintaining the optimal water content in the fuel mixture.
Figure 5A:
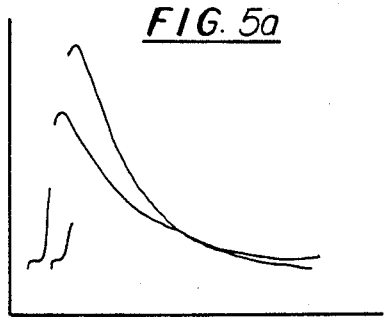
FIGS. 5a through 5d are graphic representations of the combustion dynamics of the fuel mixture produced by the invention as compared with conventional fuel dispersion.
Figure 5B:
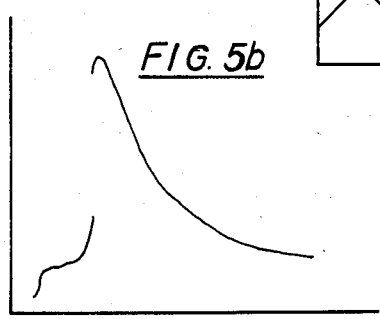
Figure 5C:
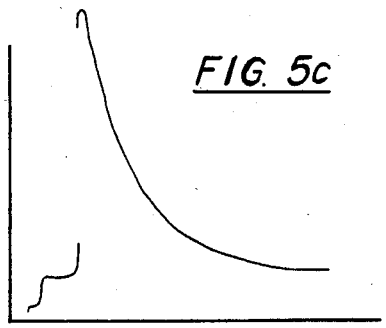
Figure 5D:
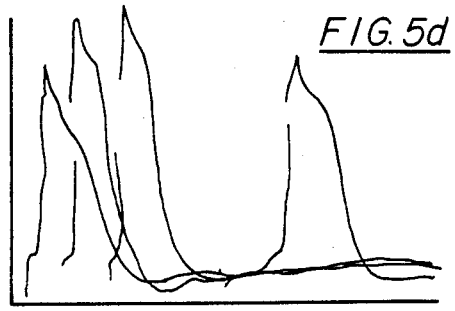

The optimal level of water in the fuel mixture in conditions of various air himidity is controlled by means of any type of humidity sensitive apparatus, such as that shown in FIG. 4. The control system shown in FIG. 4 at 29 comprises a generator G of electrical oscillations, which, in the simplest case, by be the engine alternator or electrical power line supplying AC oscillations. The signal from the generator is then brought to bridge B which contains a humidity transducer C with thermistor T, and from the bridge a signal is forwarded to differential amplifier D, and to power transistors P, wherefrom the resultant signal through coil M operates a needle valve N to control flow of water W from a suitable source to the water inlet 14 or, respectively, 38, of the microaerosol generators.

The dialectric constant of the capacity transducer C undergoes changes according to the actual himidity of air and, respectively, alters the amplitude of oscillations in the bridge. The voltage difference is amplified by the differential amplifier D and finally by the two push-pull power transistors P. The position of the needle N in the tube is determined by the electromagnetic field between coils M.

The particular conditions of construction and operation of the engine or burner decide the accuracy of the control device 29.

The second form of preferred embodiment of the invention, which operates in the passive mode, is shown in FIG. 2 at 30, and as in the first form of the invention, comprises two series-connected microaerosol generators $G_1'$ and $G_2'$. This form of invention would be used, for example, with the negative pressure generated in the cylinder of an engine or combustion chamber of a jet engine to draw the carrier substance (water and/or oxidizer) and fuel into the generators $G_1'$ and $G_2'$, respectively.

Carburetor 30 comprises a tubular housing 31 with an open upper inlet end 32 and an open lower outlet end 33, respectively A venturi 34 is positioned in the upper end and communicates via a plurality of passages 35 with a water reservoir 36 in housing 37 on the outside of tubular housing 31. Water is supplied to the reservoir via inlet 38. A partition or wall 39 extends across the interior of housing 31 in a position below the venturi 34, and openings 40 are formed in the wall of housing 31 immediately above the partition for enabling flow of air and water particles into the housing 37. Similar openings 41 are formed in the wall of housing 31 immediately below partition 39 for flow of water particles and air into the interior of housing 31 and the subsequent microaerosol generator $G_2$.

The interior of housing 37 is divided into a labryinth of tortuous passage by perforated walls 42 and 43 and 42' and 43'. These walls form a filtration column which further breaks up the particles of water as they pass through the chamber on their way from the venturi and back into the housing 31.

A second venturi 44 is positioned in the housing 31 downstream of openings 41, and communicates with a fuel reservoir 45 by means of passages 46. The fuel reservoir is formed in housing 45 on the housing 31, and the fuel is supplied from the outside via a suitable source to inlet 48. A labryinth passage is formed in housing 45 by perforated walls 49 and 50 and 49' and 50' just as in the former generator $G_1$. Thus, the mixture of particles of water and fuel in air are caused to flow through openings 51 into the labyrinth passage, where the particles impact many times against the walls and are further broken up, and thence through openings 52 and back into the housing 31. A partition 53 extends across the interior of housing 31 between the sets of openings 51 and 52.

The described form of the invention functions in all respects to produce a uniformly dispersed, homogeneous fuel-water mixture, and the supply of water to the microaerosol generator is controlled just as in the first described form of the invention.

A hybrid active-passive mode of operation is possible, in which a combination of the above fetures would be incorporated into a carburetor. The carburetor of the invention may operate synchronously and in dependence on the engine, or independently, driven by a separate compressor, as in the case of a turbo-charged engine.

In the case of reaction type engines, the microaerosol generators described herein operate with water, fuel and a respective oxidizer combined in series, regardless of the type of generator used. However, the pressure-driven generators described are the simplest. A plurality of series-connected microaerosol generators of fuel, water and oxidizer may be arranged in parrallel if necessary, particularly for jet-type internal combustion engines.

The fuel mixture resulting from use of the present invention has an extremely high degree of dispersion (to a fraction of 1 μm), a very high total surface area of the particles, a uniform and homogeneous mixture of fuel particles and carrier, and a low sedimentation rate coefficient of particles carrying static charge making it possible for the mixture to be fully evaporated or subjected to compression without coalescence of constituent particles of the mixture and subsequently introduced into the burner or engine.

The greater total surface area of the liquid phase of the fuel and the high degree of homogeneity of the microaerosol particles as compared to the conventional type of fuel atomizing result in a significant increase in the efficiency of the engine using the carburetor of the invention. The power increase of the engine is due to a considerable enhancement of the developed pressure change (dp/dt, where p=pressure and t=time) during combustion of the microaerosol fuel mixture, and to an acceleration of the first phase of the combustion of the mixture (see FIGS. *5a* through *5d*).

The presence of water results in shortening of the first phase of combustion of the mixture and enhancement of the pressure change increment during combustion, whereas an addition of traces of the water-fuel emulsion results in shortening of the total duration of combustion.

Testing of the dynamics of combustion of the microaerosol water-fuel mixture produced in accordance with the invention from both leaded and unleaded fuels, showed that the advantages apply to both types of fuels. These advantages achieved with the carburetor of the invention include significant lowering of combustion related pollutants such as hydrocarbons, carbon monoxide, nitric oxides, and the like. The conversion of carbon monoxide to carbon dioxide, due to the presence of water in the mixture, results additionally in the production of some amount of burnable hydrogen:

$$CO+H_2O=CO_2+H_2.$$

Other advantages of the described type of carburetor include the following: In the presence of water, the combustion of lubricating oil is lowered, and due to the high heat conductance coefficient of water, the temperature during the process of combustion of the microaerosol mixture is lower; the presence of water in the mixture makes it possible to enhance its anti-knock features—due to the greater solubility of anti-detonants in water than in gasoline; and further, due to the anti-explosive properties of water, unleaded gasoline may be used without experiencing deleterious knock.

The optimal content of water in the fuel mixture with preservation of the optimal gasoline/air ratio in the described carburetion is possible and independent of the work conditions of the engine, and especially results in considerable power increase in the high gasoline content of the mixture. This permits the elimination of some of the auxiliary elements of contemporary carburetor structures. For instance, the carburetor of the invention controls the power of the engine only by means of the amount and concentration of the fuel mixture supplied thereto.

The feature of the described process of carburetion by means of series-connected generators of microaerosol particles of water, fuel and oxidizer may be especially valuable where the moisture content of ambient air is very low—such as at high altitude or in desert conditions or cold climates.

If the air has a very high relative humidity, water need not be added in the carburetor of the invention. This does not detract from the other advantages of the invention resulting from the atomization of the fuel.

In situations where cooling or heating is required in some technical or maintenance conditions, the degree and efficiency of atomization of the fuel mixture in accordance with the invention are not influenced.

Having thus set forth and disclosed the nature of the invention, what it is claimed is:

1. The method of producing a furel mixture for an internal combustion engine, comprising the steps of:
    atomizing a carrier substance in a first step microaerosol generator to produce microaerosol particles thereof having a particle size in the range of from about $1 \times 10^{-6}$m to about $5 \times 10^{-8}$m;
    atomizing fuel in a second step microaerosol generator;
    causing all of the atomized carrier substance to flow through said second step microaerosol generator to entrian said atomized fuel; and
    covering the carrier substance particles with a fuel film as the carrier particles and fuel pass through the second step microaerosol generator, thereby producing a homogeneous mixture of carrier substance and fuel, comprising particles of carrier substance with a fuel film thereon.

2. The method as claimed in claim 1, wherein:
    the carrier substance is water.

3. The method as claimed in claim 1, wherein:
    the carrier substance is an oxidizer.

4. A carburetor for producing a microaerosol fuel mixture of a carrier substance and fuel, comprising:
    a housing having first and second series-connected microaerosol generators therein;
    said microaerosol generators each including labyrinth passage means through which the carrier substance and fuel are constrained to flow, respectively, whereby particles of the carrier substance and fuel repeatedly impact against the labyrinth passage means, causing the particles to break up, precluding flow therethrough of particles having a size greater than a predetermined range;
    means connected with the first generator for supplying a carrier substance thereto for generating a microaerosol of carrier substance particles having a particle size in the range of from about $1 \times 10^{-6}$m to about $5 \times 10^{-8}$m, said particle size being within said predetermined range;
    means connected with said second generator for supplying fuel thereto for generating a microaerosol of fuel particles; and
    means for causing all of the microaerosol of carrier substance particles to pass through the fuel microaerosol generator, whereby the fuel forms a film on the particles of carrier substance, producing a homogeneous mixture of fuel and carrier substance.

5. A carburetor as claimed in claim 4, wherein:
    there are two microaerosol generators connected in series, the first of the generators being connected to receive water and the second generator being connected to receive liquid fuel, the microaerosol of water passing through the second generator and including flow of fuel therethrough.

6. A carburetor as claimed in claim 5, wherein:
    an inlet for air under positive pressure is connected with the first generator;
    a nozzle and venturi are connected to receive a flow of the air under pressure, producing a low pressure and inducing flow of water into the venturi; and
    the second generator comprises a nozzle and venturi connected to receive the air and water particles from the first generator, producing a low pressure and inducing flow of fuel into the venturi of the second generator.

7. A carburetor as claimed in claim 6, wherein:
    the labyrinth passage means are defined by a series of perforated baffles positioned downstream of each venturi, defining surfaces against which the particles of water and fuel impact many times to further break up the particles, insuring that only particles in said predetermined range pass through said carburetor.

8. A carburetor as claimed in claim 7, wherein:
    control means is connected with the means supplying water for controlling the amount of water supplied in response to ambient humidity.

9. A carburetor as claimed in claim 5, wherein:
    the second generator has an outlet connected with a negtive pressure for creating a low pressure in the generators to induce the flow of water and fuel thereinto.

10. A carburetor as claimed in claim 9, wherein:
    the first and second generators each comprise a venturi and a series of perforated baffles arranged to induce flow and breakup of water and fuel particles passing therethrough.

* * * * *